Patented Mar. 9, 1937

2,073,589

UNITED STATES PATENT OFFICE 2,073,589

PRODUCTION OF ETHANE DITHIO ETHERS

Walter Reppe and Fritz Nicolai, Ludwigshafen-on-the-Rhine, Germany, assignors to I. G. Farbenindustrie Aktiengesellschaft, Frankfort-on-the-Main, Germany No Drawing. Application July 30, 1935, Serial No. 33,830. In Germany August 1, 1934

5 Claims. (Cl. 260—151)

This invention relates to the production of ethane dithio ethers.

We have found that there can be obtained from vinyl thio ethers of mono- or poly-valent mercaptans very good yields, in most cases quantitative yields, of ethane dithio ethers by the addition of any mono- or poly-valent mercaptans.

In this manner simple ethane dithio ethers having the formula $R.S.CH_2.CH_2.S.R.$ may be obtained by bringing the thio ethers into reaction with mercaptans containing the same organic radicle R, or mixed ethane dithio ethers having the formula $R_1.S.CH_2.CH_2.S.R_2$ may be obtained by causing thio ethers and mercaptans containing different radicles $R_1$ and $R_2$ to react with each other (R, $R_1$ and $R_2$ being aliphatic or isocyclic radicles). The reaction is not limited to monovalent mercaptans, but polyvalent mercaptans, for example, ethylene dimercaptan, and their vinyl thio ethers react in the same manner. Thus mercaptans of low or high molecular weight may be combined with thio ethers of low or high molecular weight and containing the same or different radicles as desired. Furthermore, since there are always two ways of arriving at the same product, the components most readily accessible in commerce for the time being may be employed.

The preparation of the simple or mixed ethane dithio ethers according to this invention is very simple.

In many cases it is sufficient to mix the components, especially when at least one is liquid, in molecular proportions, the commencement of the reaction becoming evident after a short time by an increase in the temperature of the reaction mixture.

Since in some cases the evolution of heat is very great, care should be taken if necessary for adequate cooling of the reaction vessel.

One or both of the components may also be dissolved in a suitable solvent, such as benzene, toluene, cyclohexane, chlorbenzene and dibutyl ether, and then brought to reaction in one batch or in small portions.

It is also possible to carry out the addition in the vapor phase or in a solvent of high boiling point into which the two components are led in the vapor phase or into which one component is led when the other is already dissolved in the solvent. When working in the vapor phase, increased pressure may be employed.

In many cases it is also necessary to heat the mixture of the components as such or dissolved in a suitable solvent in order to initiate the reaction or to carry it quantitatively to its completion. The reaction temperatures lie generally speaking below 300° C., especially between about 50 and 250° C.

Catalysts, for example, traces of inorganic or organic acids, alkaline acting substances, such as caustic alkalies, alkali metal alcoholates, ammonia or organic bases, may accelerate the initiation of the reaction in some cases, but generally speaking they are unnecessary.

The purification of the ethane dithio ethers is effected by crystallization, distillation or precipitation with suitable solvents.

The ethane dithio ethers may be employed as such or in the form of the sulphoxides and sulphones, for example, as dyestuff intermediates, as vulcanization accelerators or for pharmaceutical purposes.

The following examples will further illustrate how our invention may be carried out in practice, but the invention is not restricted to these examples. The parts are by weight.

Example 1

Molecular proportions of para-thiocresol vinyl ether and para-thiocresol are mixed in a stirring vessel. The reaction mixture heats itself spontaneously to from 80° to 100° C., becomes liquid and then solidifies again to form a solid crystal cake. The resulting ethane dithio di-para-tolyl ether $CH_3.C_6H_4.S.CH_2.CH_2.S.C_6H_4.CH_3$ may be crystallized from alcohol for the purpose of purification and has a melting point of about 81° C.

From equimolecular proportions of beta-thionaphthol vinyl ether and para-thiocresol or of beta-thionaphthol and para-thiocresol vinyl ether there is obtained in the same manner ethane dithio-beta-naphthyl-para-tolyl ether

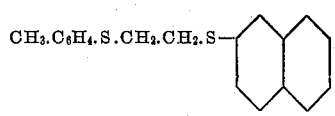

having a melting point of about 76° C.

Example 2

172 parts of 2-chlor-1.4-xylene-5-mercaptan are introduced into an enamelled vessel provided with a reflux condenser and stirring means. From 90 to 100 parts of vinyl ethyl sulphide are then added a little at a time at the rate at which the reaction proceeds and the whole is then heated for an hour at from 100° to 130° C. After fractional distillation of the liquid reaction product, the ethane dithio ether having the formula:

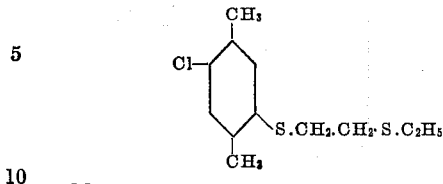

and having a boiling point of from 155° to 160° C. at 2 millimeters (mercury gauge) is obtained.

*Example 3*

100 parts of 1-mercaptoanthraquinone are heated in 300 parts of para-thiocresol vinyl ether for two hours at 130° C. After separating the excess of para-thiocresol vinyl ether by distillation and washing the residue with ether, the ethane dithio ether having the formula:

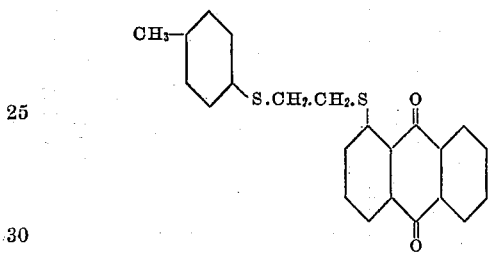

is obtained in the form of a yellow-brown powder which dissolves in concentrated sulphuric acid first giving a violet-brown coloration and then a deep olive green coloration. It is insoluble in alkaline lyes but yields a red brown vat.

From 2-mercaptoanthraquinone and para-thiocresol vinyl ether there is obtained in the same manner the ethane dithio ether having the formula:

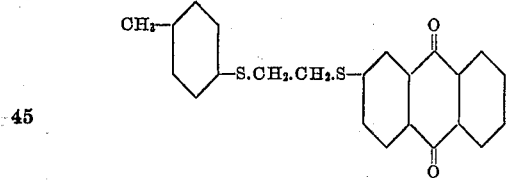

in the form of a yellow-brown powder which yields a cherry-red vat and dissolves in concentrated sulphuric acid giving a violet coloration.

*Example 4*

94 parts of ethylene dimercaptan are introduced into a stirring vessel provided with a condenser. 150 parts of para-thiocresol vinyl ether are then introduced at the rate at which the reaction proceeds. The reaction mixture is then heated for an hour at from 120° to 150° C. A crystal cake is obtained by cooling from which by crystallization from butanol the ethane dithio ether having the formula:

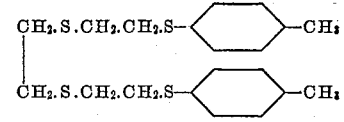

is obtained in the form of leaflets having a silvery lustre and melting at from 99° to 100° C.

What we claim is:—

1. The process of producing ethane dithio ethers which comprises treating a vinylthio ether, selected from the group consisting of vinyl ethers of mono- and polyvalent aliphatic and isocyclic mercaptans with a mercaptan selected from the group consisting of mono- and polyvalent aliphatic and isocyclic mercaptans.

2. The process of producing ethane dithio ethers which comprises treating a vinlythio ether, selected from the group consisting of vinyl ethers of mono- and polyvalent aliphatic and isocyclic mercaptans with a mercaptan selected from the group consisting of mono- and polyvalent aliphatic and isocyclic mercaptans in the presence of a solvent.

3. The process of producing ethane dithio ethers which comprises treating a vinlythio ether, selected from the group consisting of vinyl ethers of mono- and polyvalent aliphatic and isocyclic mercaptans with a mercaptan selected from the group consisting of mono- and polyvalent aliphatic and isocyclic mercaptans in the vapor phase.

4. The process of producing dithio ethers which comprises leading the vapors of a vinyl thio ether, selected from the group consisting of vinyl ethers of mono- and polyvalent aliphatic and isocyclic mercaptans and a mercaptan selected from the group consisting of mono- and polyvalent aliphatic and isocyclic mercaptans into a solvent of high boiling point.

5. The process of producing ethane dithio ethers which comprises treating a vinlythio ether, selected from the group consisting of vinyl ethers of mono- and polyvalent aliphatic and isocyclic mercaptans with a mercaptan selected from the group consisting of mono- and polyvalent aliphatic and isocyclic mercaptans, at temperatures of between 50° and 250° C.

WALTER REPPE.
FRITZ NICOLAI.